Jan. 14, 1969     S. R. MATHER     3,422,052
PREPARATION OF RUBBER COMPOSITIONS
Filed Dec. 27, 1966
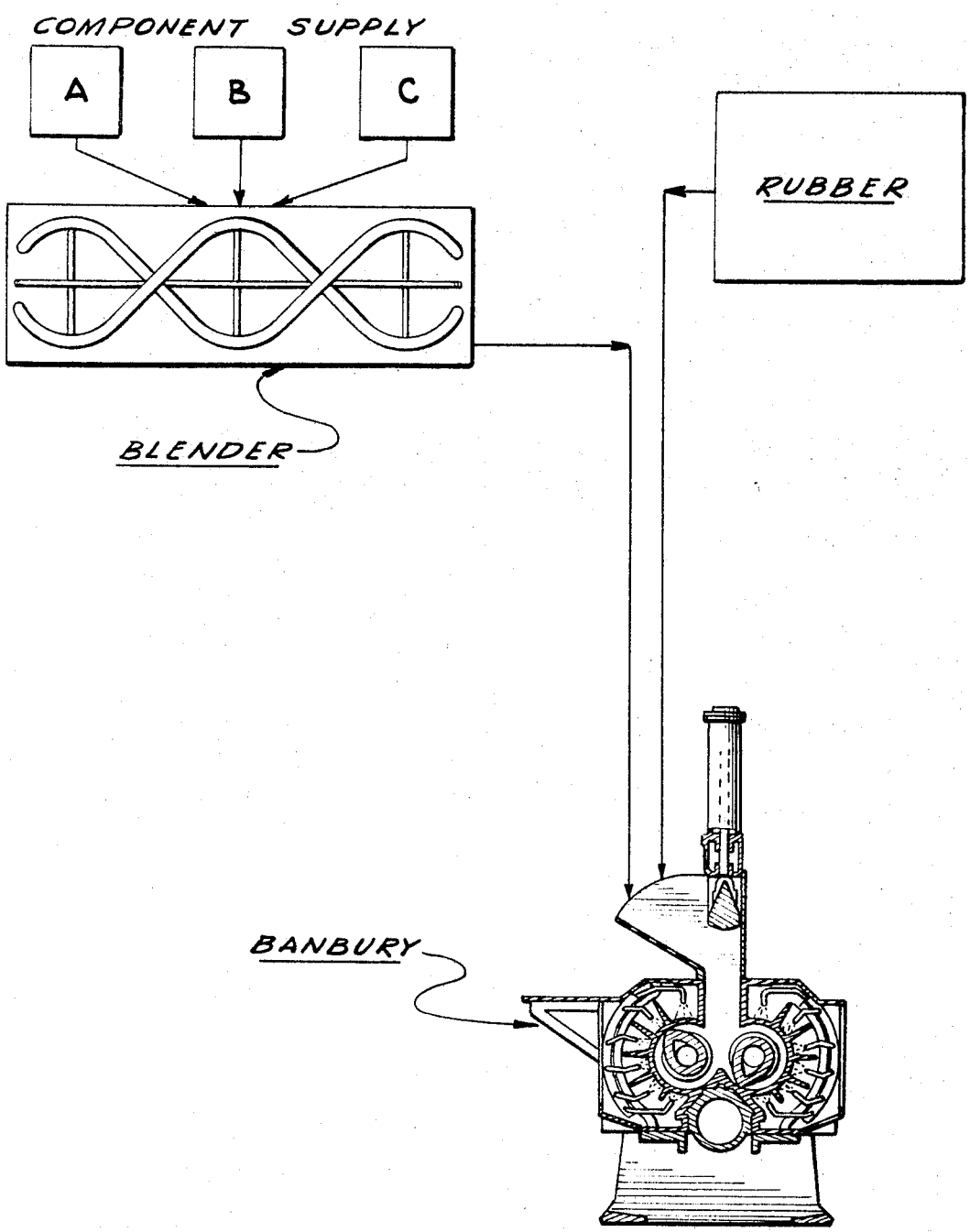
INVENTOR
Selwyn R. Mather
BY William Zolff
ATTORNEY

3,422,052
PREPARATION OF RUBBER COMPOSITIONS
Selwyn R. Mather, Elmhurst, Ill., assignor to The Richardson Company, Melrose Park, Ill., a corporation of Ohio
Filed Dec. 27, 1966, Ser. No. 605,001
U.S. Cl. 260—33.6                    3 Claims
Int. Cl. C08d 11/00

ABSTRACT OF THE DISCLOSURE

A method of producing uniform rubber compositions based on a vulcanizable rubber, sulfur, a filler of small particle size, and a non-aromatic oil by blending the components with the exception of rubber at ambient temperatures without appreciable work input, and completing the mixing by adding the rubber to the blend in an inplace, shearing and working operation at elevated temperatures to achieve the uniformity and consistency of the mix.

---

This invention relates to processes for preparing oil-containing rubber compositions having high filler content and sufficient sulfur to provide a hard rubber cure, and more particularly to processes for preparing compositions useful for molding purposes and exhibiting uniform and substantially consistent properties.

Compositions of this type have been commonly prepared in mixing operations involving equipment such as a Banbury, in which rubber is added first to the mixer followed by the other components in several separate additions. These other components primarily comprise a filler, a vulcanizing agent and oil. During the mixing, the Banbury provides an inplace, working and shearing operation on the components to provide compositions useful for molding purposes.

In the above description, the term "rubber" is considered to include both natural and synthetic rubbers or elastomers. Typical synthetic rubbers in use include styrene butadiene copolymers, neoprene, and the newer polybutadienes obtained from heterogeneous catalysts such as the Ziegler system. All of these rubbers are capable of being vulcanized with sulfur. In the compositions of interest, sulfur is used in amounts sufficient to provide a hard rubber cure which commonly is in the order of about 10–50 weight percent based on the rubber, and advantageously about 10–25 weight percent.

These compositions are also characterized by a high content of filler, and an oil in addition to accelerators, mol release agents, lime and the like. Fillers customarily are materials which are absorbent such as coal dust and are of a fine particle size, preferably below about 80 microns. Oil in these compositions serves as an extender, plasticizer or lubricant. General descriptions of oil are in "Oil Extended Rubbers" by E. B. Storey in the publication Rubber Chemistry and Technology, December 1961, vol. 34, No. 5, at page 1402, and "Oil Types in the Program for Oil-Extended Rubber" in the publication, Industrial and Engineering Chemistry, May 1955, vol. 47, No. 5, at page 1077.

In general, the oils commonly used have been either unsaturated naphthenic or aromatic types characterized by their unsaturation as distinguished from paraffinic and naphthenic oils with their saturation, since the former are reported to have better compatibility and processability. However, recently a particular saturated oil has been found to provide useful properties in these compositions and is described in copending application Ser. No. 418,856, filed Dec. 16, 1964, and now abandoned. This oil is defined with respect to the content of acidaffins and nitrogen bases.

As described above, previously it was the practice to mix the rubber, filler, vulcanizing agent and oil and other components in a mixer to obtain the useful compositions. Since the Banbury is relatively expensive, some other techniques were utilized from time to time, but did not usually result in the same combination of product qualities and process efficiencies. For instance, one approach involved preblending all the components and then subjecting the mixture to the working and shearing operation. However, in many instances, the product was characterized by unmixed chunks of rubber. In addition, the power consumed in the final mixing operation indicated a problem with some premature curing of the rubber. Therefore, for these and other reasons, this approach was not followed.

However, it was still desirable to avoid the time-consuming operations and problems associated with the usual mixing operation. It required excessive time to accomplish several additions of the other components to the rubber in the mixer. In many instances, these additions resulted in significant dusting of the filler in the adjacent atmosphere and the accompanying change in mix composition from batch to batch. When the addition of the components was reversed to avoid dusting, some of the components were not completely mixed and tended to "cake." In addition, the usual mixing operation in many instances resulted in high temperatures generated in the mix and caused problems of premature curing.

Therefore, one of the objects of this invention is the production of rubber compositions which exhibit uniform and substantially consistent properties. Another object is the production of rubber compositions without the necessity of several additions of components during the mixing operation. Yet another object is the production of rubber compositions without the dusting problems described above. Other objects will become apparent from the detailed description below and the attached drawing.

In brief, the present invention contemplates (1) a preliminary blending of the components with the exception of rubber into a loose, essentially uniform mass at substantially ambient temperature and in the absence of any appreciable work and (2) subjecting the blend and rubber to upside-down mixing in which an inplace, shearing and working operation is performed at an elevated temperature to obtain a substantially homogeneous vulcanizable mass. The result is the production of uniform batches with substantially consistent properties and with reduced dusting and other problems discussed above. In addition, this process reduces the mixing time in the Banbury by factors in the order of 35 percent which increases the output of this rather expensive mixer. In the process, it is important that the blending step does not include rubber since this can result in unmixed rubber being present in the final mix. It is also important that the oil is a non-aromatic oil with a high degree of saturation.

The drawing represents a diagrammatic plan of an apparatus arrangement which may be used in the present process. Illustrated in the drawing is a ribbon blender and a Banbury mixer. However, it is understood that other types of blending and mixing equipment may be used.

The various components (A, B, C) of the composition except for rubber are added to the blender and formed into a loose, essentially uniform mass. This operation is conveniently carried out at ambient temperature and in the absence of any appreciable work. The blend is then added to the Banbury after which the rubber is added. The Banbury produces an inplace, shearing and working operation on the mix which results in a uniform mix. When large batches are utilized in the Banbury, it may be advantageous to add a major portion of the blend followed by rubber, and after some mixing, to add the remaining blend.

Normally, temperatures within the blender are ambient since no appreciable work is expended in the blending. In the Banbury, the temperatures are elevated because of the expenditure of work in the mixing operation. Particularly with vulcanizable rubber such as butadiene-styrene copolymers, the mixing temperature is a minimum of 140° F. and does not exceed 230° F. Too low a temperature usually results in poor mixing while too high a temperature usually results in problems of premature curing of the rubber.

The process utilizes a non-aromatic oil characterized by a high degree of saturation as measured by acidaffin content and a small amount of nitrogen bases. Advantageously, the oil contains a minimum of about 75 weight percent of components with saturation at least equivalent to second acidaffins which generally includes saturates, second acidaffins, and mixtures thereof; and a maximum of about 8 weight percent nitrogen bases and about 17 weight percent first acidaffins as determined by Rostler-Sternberg analysis. In addition, the oils preferably have essentially no asphaltenes or a maximum of about 0.5 weight percent. Generally, the oil is present in the rubber-based molding composition in about 3.5–7.5 weight percent of the total composition or between about 30 to 70 weight percent based on the rubber. Usually, this latter content is in the order of about 8–20 weight percent of the composition.

The major remaining component in addition to rubber, sulfur and oil, is the filler which is a substantially inert solid of small particle size, usually being below about 80 microns. Advantageously, the filler is absorbent such as coal dust, talc, and the like.

Illustrative of a rubber composition suitable for molding is the following:

| Component: | Weight percent |
|---|---|
| Rubber (SBR) | 12.0 |
| Sulfur | 2.0 |
| Coal dust | 77.2 |
| Lime | 4.0 |
| Oil extender | 4.5 |
| Amine accelerator | 0.3 |

In the process, the components except for rubber are blended into a loose, essentially uniform, mass at substantially ambient temperature and in the absence of any appreciable work. Advantageously, this is carried out to effectively contact the filler particles with oil. The blend and rubber is subjected to upside-down mixing in which a major portion of the blend is added first to the mixing operation which is an inplace, shearing and working operation performed at an elevated temperature to obtain a substantially homogeneous vulcanizable mass. Usually, the mixing temperature is limited to a value between about 140–230° F. and more advantageously about 140–180° F. to enable mixing to occur without significant premature curing. In this respect, compositions prepared by the defined blends generally can be mixed at the lower temperatures which reduces the problem of premature curing.

The mix from the Banbury is in a form useful in molding operations. A product of particular interest is battery casings for electrical storage batteries. Since these casings in some instances may have relatively thin sections, it is important that the mix exhibit uniform and substantially consistent properties characteristic of the mix from the process of this invention.

While the invention has been described in conjunction with an example thereof, this is illustrative only. Accordingly, many alternatives, modifications, and variations will be apparent to those skilled in the art in the light of the foregoing description, and it is therefore intended to embrace all such alternatives, modifications, and variations as to fall within the spirit and broad scope of the appended claims.

I claim:
1. A process of forming homogeneous rubber compositions having uniform and substantially consistent properties in which the composition is further characterized by a low content of a rubber which will vulcanize to a hard rubber state, sufficient sulfur to obtain a hard rubber cure, a high filler content wherein the filler is a substantially inert solid of small particle size, and a non-aromatic oil with a high degree of saturation as measured by acidaffin content, said rubber content being about 8 to 20 weight percent, said sulfur and oil contents being about 10 to 50 and 30 to 70 weight percent, respectively, based on the rubber, and said filler being the major remaining component, which process comprises (1) blending the components except for rubber into a loose, essentially uniform, mass at substantially ambient temperature and in the absence of any appreciable work and (2) subjecting the blend and rubber to upside-down mixing in which a major portion of the blend is added first to the mixing operation, the mixing being an inplace, shearing and working operation which is performed at an elevated temperature within the range of between about 140 to 230° F. to obtain a substantially homogeneous vulcanizable mass.

2. The process of claim 1 wherein the oil is further characterized as having a minimum of about 75 weight percent of components with saturation at least equivalent to second acidaffins and a maximum of about 8 weight percent nitrogen base components and 17 weight percent first acidaffins.

3. The process of claim 2 wherein the filler is coal dust and the blending is carried out to effectively contact the filler particles with oil.

References Cited

UNITED STATES PATENTS

| 2,440,299 | 4/1948 | Rostler | 260—33.6 |
| 3,129,197 | 4/1964 | Farrell et al. | 260—41.5 |
| 3,251,798 | 5/1966 | Pollien | 260—33.6 |

OTHER REFERENCES

Taft et al., "Oil Types," Ind. Eng. Chem., 47, 1077 (1955).

MORRIS LIEBMAN, *Primary Examiner.*

H. H. FLETCHER, *Assistant Examiner.*

U.S. Cl. X.R.

260—34.2, 41.5